United States Patent

[11] 3,602,344

| | | |
|---|---|---|
| [72] | Inventor | William B. Clark<br>Acton, Ind. |
| [21] | Appl. No. | 869,732 |
| [22] | Filed | Oct. 27, 1969 |
| [45] | Patented | Aug. 31, 1971 |
| [73] | Assignee | General Motors Corporation<br>Detroit, Mich. |

[54] OVERLAP SHIFT CONTROLLED TRANSMISSION
13 Claims, 1 Drawing Fig.

[52] U.S. Cl. .................................................. 192/3.27,
192/3.26, 192/3.32, 192/87.13, 74/865
[51] Int. Cl. ...................................................... F16d 25/10
[50] Field of Search............................................ 192/3.27,
3.25, 3.26, 3.32, 87.18, 87.19

[56] References Cited
UNITED STATES PATENTS

| | | | |
|---|---|---|---|
| 2,612,061 | 9/1952 | Schjolin........................ | 192/3.32 X |
| 2,702,616 | 2/1955 | Black et al..................... | 192/3.26 X |
| 3,163,270 | 12/1964 | Zingsheim..................... | 192/3.27 |
| 3,182,775 | 5/1965 | Schall.......................... | 192/3.27 |
| 2,929,478 | 3/1960 | Tuck et al...................... | 192/87.13 X |
| 2,933,172 | 4/1960 | Fisher et al. ................... | 192/87.13 |

*Primary Examiner*—Benjamin W. Wyche
*Attorneys*—W. E. Finken and A. M. Heiter

ABSTRACT: A transmission having a converter drive and a direct drive clutch in which the manual neutral and drive control valve supplies fluid to engage the converter drive clutch and the governor actuated direct drive clutch valve supplies fluid through a restriction to engage the direct drive clutch and also to an accumulator pressure regulator to provide a gradual pressure rise in the direct drive clutch motor, which when it reaches a value so that the direct drive clutch carries the load, then actuates an overlap relay valve to exhaust the converter drive clutch motor to insure overlap independent of time. On a shift from direct drive to converter drive, the downshifting governor actuated direct drive valve connects the accumulator overlap valve and the direct clutch motor through a restriction to exhaust to delay disengagement of the direct clutch and promptly shifts the relay valve to supply fluid to the converter clutch for a quick engagement of the converter clutch to provide overlap. In the controls for a downshift from a higher ratio to a lower ratio, a throttle actuated valve provides an additional restriction in an exhaust line to delay a downshift at zero and low throttle as compared to the full and high throttle downshift to improve the character of the downshifts while providing fast upshifts at all throttle settings.

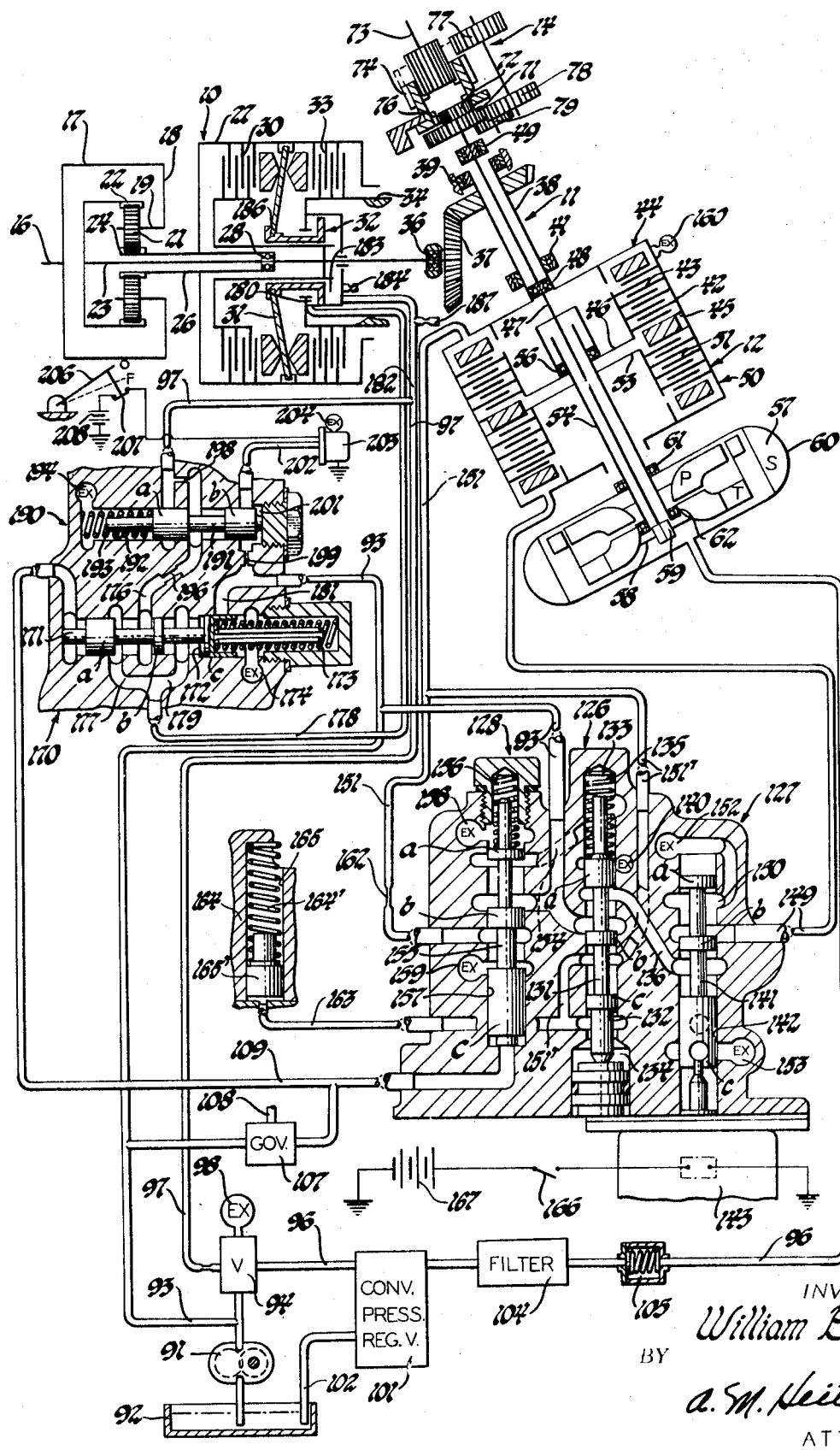

OVERLAP SHIFT CONTROLLED TRANSMISSION

This invention relates to a transmission and controls therefor.

The invention may be employed in transmissions of the type disclosed having a splitter gear unit providing a two speed input drive and direct drive and converter drive clutches to selectively drive the intermediate shaft connected by forward and reverse gearing to the output shaft. The selectively engaged converter clutch provides a torque converter drive and the direct drive clutch provides a direct drive. The control system has a neutral and drive valve which in the neutral position disengages the converter drive clutch and in the drive position supplies fluid to engage the converter drive clutch. At the speed of the vehicle where the converter multiplication ratio approaches 1:1 drive and before the efficiency reduces the governor actuates the direct drive clutch valve to connect the main line through an orifice to the direct drive clutch motor and also to an accumulator pressure regulator which causes the pressure in the direct drive clutch motor to gradually rise. When this pressure rise has reached a value sufficient to engage the direct drive clutch to carry the maximum load, the next increment of pressure rise also actuates the relay overlap valve which moves to disengage the converter clutch. Thus, on a shift from converter to direct drive, the direct drive clutch is fully established or carrying the load and then the converter clutch is released. This insures overlap independent of engagement time for a smooth shift between converter and direct drive. In the two speed splitter unit, the spring applied lower ratio is engaged by exhausting a fluid motor to a low lubrication pressure. At zero or low throttle, an additional restriction delays exhaust and thus engagement of the lower ratio so that sufficient time is permitted between the disengagement of the higher ratio and the engagement of the lower ratio for the accommodation of the speed differential for a smooth shift. At higher throttle ratios, a faster downshift is desired and this throttle controlled valve bypasses the additional restriction. The upshift timing is not affected by this downshift control.

An object of the invention is to provide in a control system for selectively shifting between a converter and direct drive clutch, a converter clutch control valve normally positioned to supply fluid to the converter clutch and a direct drive control valve normally positioned to disengage the direct drive clutch and operative on an upshift to supply fluid through a restriction to the direct drive clutch motor and to a pressure regulator which provides a gradual pressure rise and acts on the converter clutch control valve to shift this valve after the direct drive clutch is engaged sufficiently to carry the load to then disengage the converter clutch for a full overlap shift independent of timing.

Another object of the invention is to provide in a control system for selectively shifting between a converter and direct drive clutch, a converter clutch control valve normally positioned to supply fluid to engage the converter clutch and a direct drive control valve normally positioned to exhaust the direct drive clutch for disengagement and supply a downshift actuator pressure to the converter control valve to hold it in converter engaged position and on upshift of the direct drive control valve by an output speed governor signal the direct drive control valve exhausts the downshift actuator pressure and supplies a pressure through a restriction to the direct clutch to engage the direct clutch, to a pressure regulating accumulator which initially provides a low pressure sufficient to overcome the direct clutch retraction spring and then gradually increase the pressure to a value for full load carrying engagement of the direct clutch and then at a slightly higher pressure acting on the converter control valve to shift it to disengage the converter for a full overlap shift independent of the direct clutch engagement time and the direct clutch valve on a downshift operative first to supply downshift actuator pressure to the converter valve to downshift it for quick converter clutch engagement while delaying direct clutch disengagement by exhausting the accumulator and direct clutch through the restriction.

An object of the invention is to provide in a control system for selectively shifting between a low speed drive and a high speed drive, a low speed drive control valve normally positioned to supply fluid to establish the low speed drive and a high speed drive control valve normally positioned to disestablish the high speed drive and operative on an upshift to supply fluid through a restriction to establish the high speed drive and to a pressure regulator which provides a gradual pressure rise and acts on the low speed drive control valve to shift this valve after the high speed drive is engaged sufficiently to carry the load to then disengage the low speed drive for an overlap shift.

These and other objects of the invention will be more apparent from the following drawing and description of the preferred embodiment.

The drawing schematically shows the transmission gearing and control system.

This transmission drive train has a two-speed splitter input unit 10, a bevel drive unit 11, a converter drive clutch, direct drive clutch and torque converter assembly 12 and a forward and reverse output drive 14. The input shaft 16, or engine shaft, drives a flywheel 17 which is drivingly connected through the drive plate 18 to drive the carrier 19 which has planetary pinions 21 meshing with the ring gear 22 drivingly connected to the intermediate or splitter output shaft 23 and a sun gear 24 connected to the sun gear sleeve shaft 26. A clutch drum 27 is secured at a middle point to the sleeve 26 so that the center of the drum is substantially concentric with the sleeve shaft bearing 28. The splitter low or direct drive clutch 30, when engaged by the Belleville lever spring 31, when the fluid motor 32 is released, connects the sun gear and the ring gear to lock up the gear unit for direct drive or low. The brake 33, when engaged by motor 32 acting through lever spring 31, connects the sun gear 24 to the grounded housing portion or cylinder 34 of motor 32 to retard the sun gear for high or overdrive.

The splitter output shaft 23, supported at the rear end by a bearing 36, is connected by the bevel gear unit 37 to drive the angle drive input shaft 38 mounted in bearings 39 and 41 supported on the housing and the converter and direct drive clutch drum 42. The drum 42 is connected by the clutch 43 when engaged by the motor 44 to drive the direct drive hub 46, which drives the intermediate shaft 47, which is supported by a bearing 48 between the sleeve shaft 38 and a rear bearing 49 on the housing. The drum 42 also drives through the converter clutch 51, actuated by motor 50, the converter clutch hub 53 which is splined to the converter input shaft 54 which drives the pump P of the torque converter. The clutches have a common backing plate 45 fixed to drum 42. A bearing 56 between the hubs 46 and 53 supports the end of the shaft 54 and locates the direct drive clutch hub. The clutches 43 and 51 have conventional retraction springs, not shown.

The torque converter pump P drives fluid in a toroidal path in the operating chamber 57 to drive the turbine T which is connected through a hub 58 and a one-way clutch and bearing unit 59 to drive the intermediate shaft 47 in one direction and to support the intermediate shaft. The stator blades S are secured to the fixed housing 60 and provide reaction in the torque converter. The forward or pump end of the pump shaft 54 is supported to the fixed housing 60 by a bearing 61. The bearing 62 supports the turbine assembly on the shaft 54.

The shaft 47 drives the output gear 71 and clutch teeth 72. The output shaft 73 has an external spline fitting the internal spline of a gear 74 to permit axial movement and provide rotary drive. When the clutch teeth 76 on gear 74 engage the clutch teeth 72 on gear 71, direct drive is provided. When the gear 74 is moved axially and engages the gear 77 driven from the reversing idling gears 78-79, reverse drive is provided.

HYDRAULIC SYSTEM

The input driven pump 91 draws fluid from a sump 92 located in the base of the transmission housing and supplies fluid to the main line 93 at a pressure regulated by the main line regulator valve 94 which exhausts the normal overage to the converter feed line 96 and the lubrication line 97 and has an exhaust 98. The pressure in the converter feed line is regulated by the converter pressure regulator valve 101 which exhausts the overage via exhaust line 102 to sump. The converter feed line 96 is connected through a filter 104, a check valve 105 for a one-way feed to the converter operating chamber in housing 60. A governor 107 supplied with fluid from the main line 93 is driven through shaft 108 at a speed proportional to the speed of the output shaft 73 and provides in governor line 109 a governor pressure proportional to vehicle speed or output shaft speed.

The direct drive and converter drive clutches are controlled by a relay converter control valve 126, a manual converter control valve 127 and an automatic direct clutch shift valve 128. The relay valve 126 has a valve element 131 having lands $a$, $b$ and $c$ of equal diameter located in a bore 132 and biased to the open position by spring 133 when downshift actuator fluid is supplied to closed spring chamber 135 and direct clutch apply pressure to chamber 134 and closed when fluid is supplied only to the chamber 134. This valve in the open or converter drive position shown, connects the main line 93 to the transfer passage 136 leading to the manual shift valve 127 and in the closed position blocks this connection and connects transfer passage 136 to exhaust 140. The manual shift valve has a valve element 141 having lands $a$, $b$, and $c$ of equal diameter located in the bore 142, and is actuated by a solenoid 143, which in the current on or drive position connects transfer passage 136 between lands $b$ and $c$ to the converter clutch apply line 149, which supplies fluid to the converter drive motor 50 to engage the converter clutch 51. In the solenoid off or neutral position shown, passage 136 is blocked and the converter clutch apply line 149 is connected between the lands $a$ and $b$ to the exhaust 150 of the direct drive apply line 151. The ends of the bore 142 are vented by exhausts 152 and 153.

The shift valve 128 has a valve element 155 having lands $a$, $b$ and $c$ located in a bore 157 and is biased to the closed or downshift position for converter drive as shown by the spring 156. The spring chamber end of the bore is vented by exhaust 158 to prevent fluid accumulating and interfering with the action of the valve. With the shift valve in the downshift position, main line 93 is connected between lands $a$ and $b$ of shift valve 155 to relay line 154 which pressurizes the unvented spring chamber end of bore 132 to hold valve 128 in open position and the direct drive clutch valve line 151 is connected between lands $b$ and $c$ to exhaust 159 disengaging the direct drive clutch since the manual valve is in the drive position and the relay valve 126 is in the opened position, the transmission is in converter drive.

The governor pressure in the governor branch line 109 is connected to the other end of bore 157 and acts on the end of land $c$ of valve element 155. When governor pressure, which increases with increasing speed, increases sufficiently to overcome the biasing force of the spring 156, the valve moves to the upshift position connecting main line 93 to direct drive clutch apply line 151 and blocking exhaust 159. The fluid supplied to the direct clutch apply line 151 and motor 44 flows through the restriction 162 and downstream of the restriction enters branch 151' and is connected through chamber 134 to line 163 which is connected to the accumulator 164. The pressure in line 163, 151' and 151 downstream of restriction 162 rises slowly due to the restricted feed, the increasing volume and increasing spring rate of the accumulator 164 and when it reaches the pressure at which the direct drive clutch 43 is substantially engaged to carry the load, the pressure in chamber 134 downshifts valve 126. The pressure in chamber 134 on this downshift only acts against spring 133 since chamber 135 is connected by relay line 154 and upshifted shift valve 155 to exhaust 158. The downshifted relay valve 131 cuts off the supply of main line fluid from line 93 to transfer passage 136 and the converter apply line 149 and connects the converter apply line 149 via transfer line 136 to exhaust 140. The accumulator 164 has a high rate spring 164' in the vented end of bore 165 which biases the piston 165' to the closed end of the bore which is connected to line 163. Thus, on a shift to direct drive the pressure increases quickly to a low value sufficient to overcome the retraction springs and then gradually increases over an extended time period as the piston strokes.

When the pressure increases sufficiently so the direct clutch carries the load, a further small increment of pressure increases acting in chamber 134 downshifts the relay valve connecting converter clutch line 149 via transfer line 136 to exhaust 140 to then quickly disengage the converter drive for a full overlap shift. The preferred input converter clutch to input direct clutch shift is made at a speed value before the fixed housing converter efficiency reduces as the converter approaches 1:1 drive so there is little speed and torque change for a smooth shift. Then the main line 93 is directly connected between lands $b$ and $c$ of relay valve 131 via branch 151' to line 151 and motor 44 to bypass restriction 162 to insure continued full engagement and to condition the system for a downshift.

When the vehicle speed is reduced to a speed lower than the upshift speed, as determined by the conventional hysteresis provided by differential areas of lands $b$ and $c$ of valve element 155, the valve element 155 downshifts. In the downshifted position, main line 93 is connected between lands $a$ and $b$ to relay line 154 and balances the pressure in chamber 134 at the other end of the relay valve so the spring 133 opens relay valve 126 to connected main line 93 to transfer line 136, converter clutch line 149 and motor 50 for converter drive. At the same time direct drive clutch line 151 is connected between lands $b$ and $c$ to exhaust 159. Since the volume of fluid from the direct clutch motor 44 and the accumulator 164 must flow through restriction 162 and a restricted exhaust 160 smaller than restriction 162 in the rotary cylinder of the rotary motor 44, there is a sufficient time delay before the direct drive clutch is unloaded to permit the converter clutch to pick up the load before it is dropped by the direct drive clutch. This time delay is provided and timed by the accumulator capacity above the high load carrying pressure which occurs during the gradual pressure rise provided by the accumulator. The restricted exhaust prevents centrifugally induced pressure in the rotary cylinder holding the direct drive clutch in a partially engaged position and insures a proper timed full disengagement. The rotary cylinder of the converter clutch may have a similar restricted exhaust for the same purpose.

For drive, the switch 166 is closed to connect the battery 167 to energize the solenoid 143 to place the valve 127 in the on position so the converter apply line 149 will be connected to transfer line 136 to engage the converter clutch. For neutral, switch 166 is disconnected, valve 127 is in the on position blocking transfer line 136 and connecting converter clutch line 149 to exhaust 150 to prevent converter drive. When in neutral, the shift valve 128 will upshift to provide engine braking at speeds at which direct drive is engaged.

A splitter shift valve 170 controls the supply of main line fluid and lubricating fluid to the double acting motor 32 to control the operation of the splitter low and splitter high motors. This valve has a valve element 171 having lands $a$ and $b$ of small diameter and a larger land $c$ located in a stepped bore 172 and is biased toward the downshift position by spring 173 in a chamber vented by exhaust 174. In the downshift position, the valve 170 connects the lubrication transfer line 176 to the branch 177 to overdrive apply line 178 connected to overdrive apply chamber 180 of motor 32 and blocks branch 179 of overdrive apply line 178 between lands $b$ and $c$ and branch 181 of main line 93 at land $c$. The lubrication line 97 is connected by branch 182 to the release chamber 183 which has a restricted exhaust 184 to lubrication to continuously vent the release chamber 183 and thus maintain a lower pressure acting on the larger area of the release side of the piston to provide a biasing force to almost balance the higher lubricating pressure in apply chamber 180 acting on the smaller area of the apply side of the piston, and provide a small residual force to the right in the drawing or the apply direction which keeps the transfer bearing 186 engaged. When the speed increases sufficiently to provide a governor pressure to upshift the shift valve, the valve will, in the upshift position, connect main line 93 via branch 181 to the branch 179 of apply line 178 to move the motor 32 to engage the overdrive clutch. The lubrication branch line 182 has restricted branch or branches 187 to lubricate the gearing.

The downshift valve 190 has a valve element 191 having lands $a$ and $b$ in bore 192 and is biased to the zero throttle position by spring 193 located in the spring chamber end of the bore vented by exhaust 194. In this position, lubrication transfer passage 176 which has a large opening restriction 196 therein, is connected between lands $a$ and $b$ of valve element 191 to the small opening restricted passage 198 to lubrication line 97 so flow from lubrication line 97 to overdrive apply line 178 is more restricted at zero throttle.

The main line 92 is also connected by restriction 199 to the end 201 of bore 192 to act on end of land $b$ to move the valve element against the spring 193 to directly connect lubrication transfer line 176 to lubrication line 97, thus bypassing restricted passage 198 to provide faster flow at part and full throttle positions. The end chamber 201 of the bore 192 is also connected by passage 202 to a solenoid valve 203 which normally, when not energized, is spring loaded to block passage to exhaust 204. When the accelerator pedal 206 is in the zero throttle, or close to zero throttle positions, the switch 207 is closed and battery 208 energizes solenoid valve 203 to connect line 202 to exhaust 204 to vent chamber 201 so spring 193 will position valve element 191 so land $a$ blocks free flow through the valve and requires all flow to be through small restriction 198. Thus, on a low or zero throttle downshift overdrive apply line 178 is restricted by restrictions 196 and 198 so a slow smooth shift is made. This gives the engine time to decelerate before the shift is completed. Upshifts will only occur at higher throttle positions. Downshifts at higher throttle positions are not delayed and are smooth.

It will be understood that references to the direction of movement of valves on the drawing is for convenience of explaining the illustrated preferred embodiment of the invention which may be used in modified forms.

It is claimed:

1. In a transmission; drive means having a fluid motor operation a friction device for establishing a torque converter drive and a fluid motor operating another friction device for establishing a direct drive; a source of fluid under a regulated pressure; relay valve means biased to a converter drive position connecting said source to said converter motor to establish converter drive and having first fluid actuator means operative on the supply of fluid thereto to shift said relay valve means to a converter disestablished position connecting said converter motor to exhaust; shift valve means including a restriction operative in a first position to connect said direct drive motor through said restriction to exhaust and operative in a second position to connect said source through said restriction to said direct drive motor; pressure controlling means connected to said direct drive motor operative in response to fluid pressure therein to gradually increase the pressure from a low value to a high value; said first fluid actuator means being connected to said direct drive motor for operation at a predetermined pressure for shifting said relay valve means to said converter disengaged position after engagement of said direct drive.

2. The invention defined in claim 1 and said direct drive motor engaging said friction device for carrying the full load at a value intermediate said low and high value and said first fluid actuator means being operative in response to a pressure value above said intermediate value to shift said relay valve means against said bias from said converter drive position to said converter disestablished position for disestablishing converter drive after said direct drive is established.

3. The invention defined in claim 2 and said relay valve means having a second fluid actuator means operative on the supply of fluid thereto to shift said relay valve means from said converter disestablished position to said converter established position and said shift valve means being operative in said first position to connect said source to said second fluid actuator means to shift said relay valve means from said converter disestablished to said converter established position immediately on a shift of said shift valve means from said second position to said first position to immediately initiate establishment of said converter drive.

4. The invention defined in claim 3 and said pressure controlling means including an accumulator operative on a shift of said shift valve means from said second position to said first position to supply fluid at a pressure decreasing from the high value to the low value at a slow rate to the direct drive fluid motor being exhausted through said restriction so the direct drive remains established until the converter drive is established and then the direct drive is disestablished.

5. The invention defined in claim 4 and said direct drive fluid motor being a rotary motor having an exhaust restriction smaller than the restriction of said shift valve means to time the exhaust of centrifugally created pressure in said direct drive fluid motor when exhausted by said shift valve means through the restriction of the shift valve means.

6. In a transmission; drive means providing a torque converter drive and a direct drive; torque converter friction drive establishing means operatively connected to said drive means and including a fluid motor for establishing said torque converter drive; direct drive friction establishing means operatively connected to said drive means and including a fluid motor for establishing said direct drive; a source of fluid under pressure; relay valve means biased to a first position connecting said source to said converter motor and having a first fluid actuator means operative on the supply of fluid thereto to move said relay valve means to a second position connecting said converter drive motor to exhaust; a supply line having a restriction and connected downstream of said restriction to said direct drive motor; shift valve means operative in the first position to connect said supply line to exhaust and operative in an upshift position to connect said source to said supply line and through said restriction therein to said direct drive motor; pressure controlling means connected to said supply line and said direct drive motor downstream of said restriction in said supply line operative in response to the supply of pressure to said direct drive motor to gradually increase the pressure in said supply line downstream of said restriction and in said direct drive motor through a range of pressure values to a value at which the direct drive carries the load and then to a higher pressure value; said first fluid actuator means of said relay valve being connected to said supply line and said direct drive motor downstream of said restriction and being responsive to said higher pressure value to initiate disengagement of the converter drive after load carrying engagement of said direct drive is established to provide overlap on a shift from the converter drive to the direct drive.

7. The invention defined in claim 6; said relay valve having a second fluid actuator means operative on the supply of fluid thereto to move said relay valve means from said second position to said first position and said shift valve means operative in said first position to connect said source to said second actuator means to quickly move said relay valve means to said first position and establish converter drive before disengagement of said direct drive.

8. The invention defined in claim 7 and said pressure controlling means including an accumulator means for delaying the decay of pressure in said direct drive motor when said shift valve means is in said first position to hold said direct drive established until said converter drive is established for an overlap shift.

9. The invention defined in claim 8 and a governor operatively connected to aid shift valve means to move it from said first position to said second position in response to the output speed of said drive means.

10. In a transmission; drive means providing a torque converter drive and a direct drive; torque converter drive establishing means operatively connected to said drive means and including a rotary fluid motor for establishing said torque converter drive; direct drive establishing means operatively connected to said drive means and including a rotary fluid motor having a restricted exhaust and retraction springs and being operative at an intermediate pressure value in said motor for establishing said direct drive; a source of fluid at a regulated high pressure, pressure control accumulator means connected to said fluid motor operative in response to the supply of fluid to initiate a pressure control cycle providing a quick pressure rise to a low value sufficient to overcome said retraction spring and then a slow pressure rise from said low value through said intermediate value to a higher value and then increase the pressure to said high regulated value and provide an inverse cycle on the exhaust of fluid; relay valve means having biasing means, downshift fluid actuator means and upshift fluid actuator means with an unrestricted connection to said direct drive motor and said biasing means and downshift fluid actuator means both acting to overcome said upshift fluid actuator means to bias said relay valve means to a first position connecting said source to said converter motor for establishing converter drive and said upshift fluid actuator means operative in response to a pressure slightly higher than said intermediate pressure when the downshift fluid actuator means is inoperative, against said biasing means to move said relay valve to a second position connecting said converter drive motor to exhaust to disestablish said converter drive; shift valve means having a restricted passage providing a larger flow than said restricted exhaust operative in a first position to connect said source to said downshift fluid actuator means to act with said biasing means to hold said relay valve means in said first position establishing said converter drive and connecting said direct drive motor through said restricted passage to exhaust and operative when shifted to a second position to connect said downshift fluid actuator means to exhaust and connect said source through said restricted passage to said direct drive motor and to said accumulator means to initiate a pressure control cycle of the pressure in said direct drive motor means and said upshift fluid actuator means which at said intermediate pressure value establishes load carrying direct drive and at a slightly higher pressure value actuates said upshift fluid actuator to shift said relay valve to said second position to disestablish converter drive and directly connect said source to said direct drive motor to maintain direct drive and condition the system for a shift to said first position to connect said source to said downshift fluid actuator means to act with said biasing means to shift said relay valve against the activate upshift fluid actuator means blocking the direct connection from said source to said direct drive motor and connecting said source to said converter motor for converter drive and connecting said accumulator means and direct motor through said restriction to exhaust to delay, during the time that said inverse cycle of said accumulator means gradually reduces the pressure to said intermediate value, disestablishing said direct drive until after said converter drive is established.

11. In a transmission; drive means having low speed drive fluid motor means operating a friction device for establishing a low speed drive providing high torque multiplication and high speed drive fluid motor means operating another friction device for establishing a high speed drive providing low torque multiplication; a source of fluid under a regulated pressure; relay valve means biased to a low speed drive position connecting said source to said low speed drive fluid motor means to establish low speed drive and having first fluid actuator means operative on the supply of fluid thereto to shift said relay valve means to a low speed drive disestablished position connecting said low speed drive fluid motor means to exhaust; shift valve means including a restriction operative in a first position to connect said high speed drive fluid motor means through said restriction to exhaust and operative in a second position to connect said source through said restriction to said high speed drive fluid motor means; pressure controlling means connected to said high speed drive fluid motor means operative in response to fluid pressure therein to gradually increase the pressure from a low value to a high value; said first fluid actuator means being connected to said high speed drive fluid motor means for operation at a predetermined pressure for shifting said relay valve means to said low speed drive disengaged position after engagement of said high speed drive.

12. The invention defined in claim 11 and said relay valve means having a second fluid actuator means operative on the supply of fluid thereto to shift said relay valve means from said low speed drive disestablished position to said low speed drive established position and said shift valve means being operative in said first position to connect said source to said second fluid actuator means to shift said relay valve means from said low speed drive disestablished position to said low speed drive established position immediately on a shift of said shift valve means from said second position to said first position to immediately initiate establishment of said low speed drive.

13. The invention defined in claim 11 and said high speed drive fluid motor being a rotary motor having an exhaust restriction smaller than the restriction of said shift valve means to time the exhaust of centrifugally created pressure in said low speed drive fluid motor when exhausted by said shift valve means through the restriction of the shift valve means.

PO-1050
(5/69)

UNITED STATES PATENT OFFICE
CERTIFICATE OF CORRECTION

Patent No. 3,602,344           Dated August 31, 1971

Inventor(s) William B. Clark

It is certified that error appears in the above-identified patent and that said Letters Patent are hereby corrected as shown below:

In the specification, column 1, line 16, after "converter" insert -- torque --. Column 4, line 15, "increases" should be -- increase --; line 42, "rime" should be -- time --; line 71, "to" first occurrence, should be -- of --. Column 5, line 24, numeral "92" should be -- 93 --. In the claims, column 5, claim 1, line 52, "operation" should be -- operating --. Column 7, claim 9, line 2, "aid" should be -- said --. Column 8, line 2, "activate" should be -- activated --.

Signed and sealed this 22nd day of February 1972.

(SEAL)
Attest:

EDWARD M. FLETCHER, JR.        ROBERT GOTTSCHALK
Attesting Officer                Commissioner of Patents